3,065,180
SYNTHETIC LUBRICANTS
Samuel Richard Pethrick and Maurice Barrington Sparke, Sunbury-on-Thames, England, assignors to The British Petroleum Company Limited, London, England, a British joint-stock corporation
No Drawing. Filed May 19, 1958, Ser. No. 736,010
Claims priority, application Great Britain May 24, 1957
3 Claims. (Cl. 252—56)

This invention relates to synthetic lubricants.

Synthetic lubricants have previously been proposed consisting of a blend of a liquid aliphatic diester of a saturated aliphatic dicarboxylic acid and a polyester of the general formula:

$$HO(R_2OOCR_1COO)_nR_2OH \quad (I)$$

where $R_1$ is the hydrocarbon radical of an aliphatic dicarboxylic acid, $R_2$ is the hydrocarbon radical of a glycol and $n$ is a number from 1–10 (see U.K. patent specification 763,077).

We have now found that certain blends of the above type, or similar to the above type, can be produced that have properties which render them particularly suitable for aero gas turbine lubrication.

According to the invention, a lubricating composition comprises a blend of a liquid aliphatic diester of a saturated aliphatic dicarboxylic acid, and a polyester, soluble in the diester, and having the general formula:

$$HO[CH_2C(R_6)(R_7)CH_2OOCR_1COO]_n \\ CH_2C(R_6)(R_7)CH_2OH \quad (II)$$

where:

$n$ is an integer,

The $R_6$'s are methyl or ethyl groups, preferably methyl groups,

The $R_7$'s are alkyl groups having 1–4 carbon atoms, preferably methyl or propyl groups, and The $R_1$'s are alkylene groups having 4–14, preferably 6–10 carbon atoms, the relative proportions of diester and polyester in the blend being such that the viscosity of the blend at 210° F. is 4–30, especially 4–10, particularly 6–10, centistokes.

Preferred diesters for use in the blends according to the invention are those of the formula:

$$R_4OOCR_5COOR_4$$

where $R_5$ is an alkylene group having 4–14 carbon atoms and the $R_4$'s are alkyl groups, preferably branched chain having 4–18 carbon atoms.

Examples of suitable diesters are:

(a) Di(2-ethylhexyl) sebacate (di-octyl sebacate).
(b) Di(3:5:5-trimethylhexyl) sebacate (di-nonyl sebacate).
(c) 2-ethylhexyl (3:5:5-trimethylhexyl) sebacate (octyl nonyl sebacate).
(d) A mixture of (a), (b) and (c).

Preferred polyesters are those of Formula II having a viscosity at 25° C. of at least 50, especially at least 500, centistokes, particularly those in which the $R_1$'s have 7 or 8 carbon atoms, especially octamethylene, 1-ethyl-hexamethylene, 1:4-diethyltetramethylene, 1:1:3-trimethyltetramethylene or 1:3:3-trimethyltetramethylene.

It is to be understood that different $R_6$ groups, different $R_7$ groups and different $R_1$ groups may be present in any given polyester molecule, that different $R_4$ groups may be present in any given diester molecule and that mixtures of different polyester molecules and/or different diester molecules may be present in the same blend.

Polyesters for use in the lubricant blend according to the invention may be prepared by reacting in one or more stages, the following ingredients:

(a) An acid or acids of the formula $HOOCR_1COOH$, and
(b) A diol or diols of the formula $$HOCH_2C(R_6)(R_7)CH_2OH$$

where $R_1$, $R_6$ and $R_7$ have the values given previously, the molecular portion of diol(s) being greater than, but preferably not more than twice, the molecular proportion of acid(s). As stated above, mixtures of polyesters of Formula I may be used in the lubricant blend i.e. polyesters having different values of $n$ and having different acid and diol residues. With such a mixture, the average value of $n$ would not necessarily of course be a whole number. Thus when preparing a polyester mixture, the molecular proportions of the ingredients to be reacted need not be present in whole number ratios.

Examples of acids which may be used in the preparation of the polyester are adipic acid, azelaic acid, brassylic acid, suberic acid and pimelic acid.

Particularly satisfactory acids have been found to be:

(a) Sebacic acid,
(b) Commercial iso-sebacic acid which consists essentially of 2-ethyl suberic acid (72–80% wt.), 2:5-diethyladipic acid (12–18% wt.) and sebacic acid (6–10% wt.), and
(c) An equimolecular mixture of 2:2:4-trimethyl adipic acid, 2:4:4-trimethyladipic acid and sebacic acid.

The most satisfactory diols have been found to be:

(a) 2:2-dimethyl-1:3-propanediol (neopentyl glycol), and
(b) 2-methyl-2-propyl-1:3-propanediol (available commercially under the trade name "Mepropol").

Preferably the blend according to the invention is one containing 5–60% by weight of polyester, especially 5–35%, the remainder of the blend being substantially diester.

Any antioxidant for lubricants, for example phenothiazine, may be incorporated in the blend if desired.

Polyesters P21, P27, P221, P222, P223 and P226 were prepared from the ingredients listed in Table I below by the following method:

The ingredients were reacted in a three-necked flask fitted with a stirrer, a nitrogen inlet tube and a water-cooled, downward facing condenser fitted with a Dean and Stark water trap. The water was removed from the trap at such a rate that the diol/water interface remained static at the top of the trap thus ensuring that the diol in the distillate was automatically returned to the reaction vessel. A nitrogen flow rate of 6 litres/hour was used and the following heating cycle was carried out:

Heat to 200° C. over 8 hours.
Maintain at 200° C. for 40 hours.
Maintain at 200° C. at 1 mm. of mercury pressure until an acid value of <1 mg. KOH/g. was obtained.

Table I gives the composition and properties of polyesters P21, P27, P221, P222, P223 and P226.

Table I

| Polyester | Molecular proportions | | | | | | Viscosity at 25° C. |
|---|---|---|---|---|---|---|---|
| | Commercial isosebacic acid | 2:2:4-trimethyl adipic acid | 2:4:4-trimethyl adipic acid | Sebacic acid | Neopentyl glycol | "Mepropol" | |
| P21 | | | | 1.0 | 1.1 | | 26,160 cs. |
| P27 | | | | 1.5 | | 1.64 | 31,400 cp. |
| P221 | 1.0 | | | | 1.14 | | 50,520 cp. |
| P222 | 0.8 | | | | 0.88 | | Immobile. |
| P223 | 0.48 | | | | 0.57 | | Insufficient sample. |
| P226 | | 0.33 | 0.33 | 0.33 | 1.1 | | 90,000 cs. |

NOTE.—cs. = centistokes, cp. = centipoises.

These polyesters were blended with a diester and phenothiazine to form blends B21, B27, B221, B222, B223 and B226 having the compositions and properties shown in Table II. The diester was prepared from equimolecular amounts of sebacic acid, 2-ethylhexyl alcohol and 3:5:5-trimethylhexyl alcohol. In addition to octyl nonyl sebacate, the product also contained di-octyl and di-nonyl sebacates. By way of comparison, certain properties are also given of a commercially available synthetic aero gas turbine lubricant (X) and of a blend (B61) containing a known polyester of Formula I (P61) which consists of a poly (propylene sebacate) available commercially under the trade name "Reoplex 100."

It will be seen that the blends according to the invention (B21, B27, B221, B222, B223 and B226) have greatly improved thermal stability compared with blend B61. (Thermal stability is indicated by a low change in viscosity after the high temperature treatment.) Furthermore, blends B21, B27, B221, B222, B223 and B226 show excellent low temperature properties whereas blends B61 and X give poor performances at low temperatures.

The low temperature properties of blends according to the invention may be further improved if desired by the addition of a crystallisation suppressant, e.g. a polymerised alkyl ester of acrylic or methacrylic acid, but it is an advantage when good low temperature properties can be achieved without the addition of such materials since they appear to have an adverse effect on both the thermal stability and shear stability of blends containing them.

The Open Beaker Test referred to in Table II was carried out as follows: 250 ml. of oil were heated in a 400 ml. beaker in an oven maintained at an air temperature at 300° C. Samples of the oil were withdrawn after heating for 2, 3, 4 and 5 hours and the viscosity at 100° F. measured.

Table II

| Blend | Ingredients of blends: percent weight | | | Viscosity at 210° F., centistokes | Viscosity at 100° F., centistokes | Low temperature performance | | Thermal stability (open beaker test): Max. change in viscosity at 100° F., percent |
|---|---|---|---|---|---|---|---|---|
| | Diester | Polyester | Phenothiazine | | | Viscosity at −40° F.,[1] centistokes | Supercooling test | |
| B21 | 87.63 | 11.37 (P21) | 1.0 | 7.76 | 36.12 | 9,650 | | −0.3 |
| B27 | 86.29 | 12.71 (P27) | 1.0 | 7.90 | 37.98 | 8,888 | Immobile but clear after 162 hours at −70° C. Mobile again by −54° C. | +4.2 |
| B221 | 86.06 | 12.94 (P221) | 1.0 | 7.8 | 37 | 10,000 | Immobile but clear after 90 hours at −70° C. Mobile again by −58° C. | +4.2 |
| B222 | 90.43 | 8.57 (P222) | 1.0 | 7.8 | 35.5 | 7,670 | Immobile and opalescent after 136 hours at −68° C. Mobile and clear again by −55° C. | −12.1 |
| B223 | 84.26 | 14.74 (P223) | 1.0 | 7.82 | 37.80 | 11,345 | Clear after 96 hours at −70° C and mobile again by −67° C. | |
| B226 | 87.23 | 11.77 (P226) | 1.0 | 7.7 | 36.2 | 9,450 | Immobile but clear after 162 hours at −70° C. Mobile again at −54° C. | −1.2 |
| B61 | 91.46 | 7.54 (P61) | 1.0 | 6.50 | 28.36 | Immobile | | −20.2 |
| X | | | | 7.51 | 35.85 | Immobile | | +13.0 |

[1] After prechilling at −65° F. for 12 hrs.

We claim:
1. A lubricating composition consisting essentially of a blend of at least 1 diester selected from the group consisting of di(2-ethylhexyl) sebacate, di(3:5:5-trimethylhexyl) sebacate and 2-ethylhexyl (3:5:5-trimethylhexyl) sebacate, and a polyester, soluble in the diester, having the general formula

$$HO[CH_2C(CH_3)_2CH_2OOCR_1COO]_nCH_2C(CH_3)_2CH_2OH$$

where $n$ is an integer, and which has been prepared by reacting an acid of the formula $HOOCR_1COOH$, where $R_1$ is an alkylene group having 7–8 carbon atoms, with a diol of the formula $HOCH_2C(CH_3)_2CH_2OH$, the molecular proportion of diol being greater than but not more than twice the molecular proportion of acid, the amount of polyester in the composition being 5–35% by weight, the viscosity of the polyester at 25° C. being at least 500 centistokes and the relative proportions of diester and polyester in the blend being such that the viscosity of the blend at 210° F. is 6–10 centistokes.

2. A lubricating composition according to claim 1, in which the polyester is one in which the $R_1$'s are radicals selected from the group consisting of octamethylene, 1-ethylhexamethylene, 1-4-diethyltetramethylene, 1:1-3-trimethyltetramethylene and 1:3:3-trimethyltetramethylene.

3. A lubricating composition, according to claim 1, containing in addition a minor amount of phenothiazine as an antioxidant.

(References on following page)

References Cited in the file of this patent

UNITED STATES PATENTS

| | | |
|---|---|---|
| 2,499,984 | Beavers et al. | Mar. 7, 1950 |
| 2,628,974 | Sanderson | Feb. 17, 1953 |
| 2,729,665 | Buckmann | Jan. 3, 1956 |
| 2,798,083 | Bell et al. | July 2, 1957 |
| 2,889,354 | Blake et al. | June 2, 1959 |
| 2,929,786 | Young et al. | Mar. 22, 1960 |

FOREIGN PATENTS

| | | |
|---|---|---|
| 763,077 | Great Britain | Dec. 5, 1956 |

OTHER REFERENCES

Barnes et al.: "Lubrication Eng.," August 1957, pages 454–458.